United States Patent [19]
Arendt et al.

[11] Patent Number: 5,961,650
[45] Date of Patent: Oct. 5, 1999

[54] SCHEME TO PERFORM EVENT ROLLUP

[75] Inventors: James W. Arendt, Round Rock; Rodolfo Augusto Mancisidor, Austin; Jayashree Ramanathan, Round Rock, all of Tex.

[73] Assignee: International Business Machines Corporation, Armonk, N.Y.

[21] Appl. No.: 08/890,505

[22] Filed: Jul. 9, 1997

[51] Int. Cl.⁶ ............................................. G06F 9/38
[52] U.S. Cl. .............................. 714/2; 714/4; 714/1
[58] Field of Search ........................... 395/182.02, 682, 395/670, 704, 733, 735, 736, 737, 739, 742, 180, 181, 182.01, 182.08, 182.09, 182.11, 182.13, 182.14, 183.1, 183.11

[56] References Cited

U.S. PATENT DOCUMENTS

| | | | |
|---|---|---|---|
| 5,625,788 | 4/1997 | Boggs et al. ............................. | 395/390 |
| 5,805,785 | 9/1998 | Dias et al. ............................ | 395/182.02 |
| 5,822,531 | 10/1998 | Gorczyca et al. ................. | 395/200.51 |

*Primary Examiner*—Ly V. Hua
*Attorney, Agent, or Firm*—Jeffrey S. LaBaw; Daniel E. Venglarik; Andrew J. Dillon

[57] ABSTRACT

A user definable set of event rollup relationships are maintained as a configuration element. Transitive closure of event rollup relationships is checked at the time of specification to detect cycles and prevent runtime errors. When an event to be processed is detected, the event is compared to defined rollup relationships and queued events to determined if the detected event may be rolled up into at least one queued event or vice versa. If the detected event may be rolled up into a queued event, the detected event is not queued. When any of the queued event may be rolled up into the detected event, the queued events are deleted if processing has not already begun.

23 Claims, 4 Drawing Sheets

SCHEME TO PERFORM EVENT ROLLUP

BACKGROUND OF THE INVENTION

1. Technical Field

The present invention relates in general to cluster multiprocessing systems and in particular to event handling within cluster multiprocessing systems. Still more particularly, the present invention relates to rollup of queued events within a high availability cluster multi-processing system.

2. Description of the Related Art

High availability (HA) is gaining widespread commercial acceptance as an alternative to fault tolerance for mission-critical computing platforms. Fault tolerant data processing systems rely on specialized hardware to detect hardware faults and switch to a redundant hardware component, regardless of whether the component is a processor, memory board, hard disk drive, adapter, power supply, etc. While providing seamless cutover and uninterrupted performance, fault tolerant systems are expensive due to the redundant hardware requirement. Additionally, fault tolerant systems do not address software errors, a more common source of data processing system failure.

High availability utilizes standard hardware, but provides software allowing resources to be shared system wide. When a node, component, or application fails, an alternative path to the desired resource is quickly established. The brief interruption required to re-establish availability of the resource is acceptable in many situations. The hardware costs are significantly less than fault tolerant systems, and backup facilities may be utilized during normal operation.

Highly available systems are often implemented as clustered multiprocessor (CMP) systems. A cluster includes a plurality of nodes or processors connected to shared resources, such as shared external hard disks. Typically, each node runs a server or "back end" application permitting access to the shared resources. A node may "own" a set of resources—disks, volume groups, file systems, networks, networks addresses and/or applications—as long as that node is available. When that node goes down, access to the resources is provided through a different node.

Within clustered multiprocessing systems, it is advantageous to provide an event rollup function. In highly available clusters, various events may occur, including node failure, adapter failure, application failure, etc. Processing these events typically requires coordinated multiphase actions across the cluster, with barriers in between phases. However, certain events may be "rolled up" or subsumed within other events. That is, a first event may require only actions which are a subset of the actions required by a second event. Thus, occurrence of the second event while a response to the first event is pending obviates the need for specifically responding to the first event, since responding to the second event achieves the desired result.

Rolling up events may substantially reduce the overhead of event processing, particularly in large clusters. At least one prior art cluster software package—HACMP for AIX®, available from International Business Machines Corporation of Armonk, N.Y.—provides some event rollup capabilities. However, only a limited set of events are rolled up: adapter failures are rolled up into node failures. Moreover, the rollup function is hardcoded into the cluster software and may not be specified or changed by a user. The event rollup information may not be altered by a user in any manner, much less dynamically (changing the event rollup information without having to stop and then restart cluster services).

It would be desirable, therefore, to provide cluster software with facilities permitting dynamic specification or alteration of event rollup information by a user.

SUMMARY OF THE INVENTION

It is therefore one object of the present invention to provide an improved cluster multiprocessing system.

It is another object of the present invention to provide improved event handling within cluster multiprocessing systems.

It is yet another object of the present invention to provide dynamically modifiable rollup of queued events within a high availability cluster multiprocessing system according to user-defined information.

The foregoing objects are achieved as is now described. A user definable set of event rollup relationships are maintained as a configuration element. Transitive closure of event rollup relationships is checked at the time of specification to detect cycles and prevent runtime errors. When an event to be processed is detected, the event is compared to defined rollup relationships and queued events to determined if the detected event may be rolled up into at least one queued event or vice versa. If the detected event may be rolled up into a queued event, the detected event is not queued. When a queued event may be rolled up into the detected event, the queued event is deleted if processing has not already begun.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
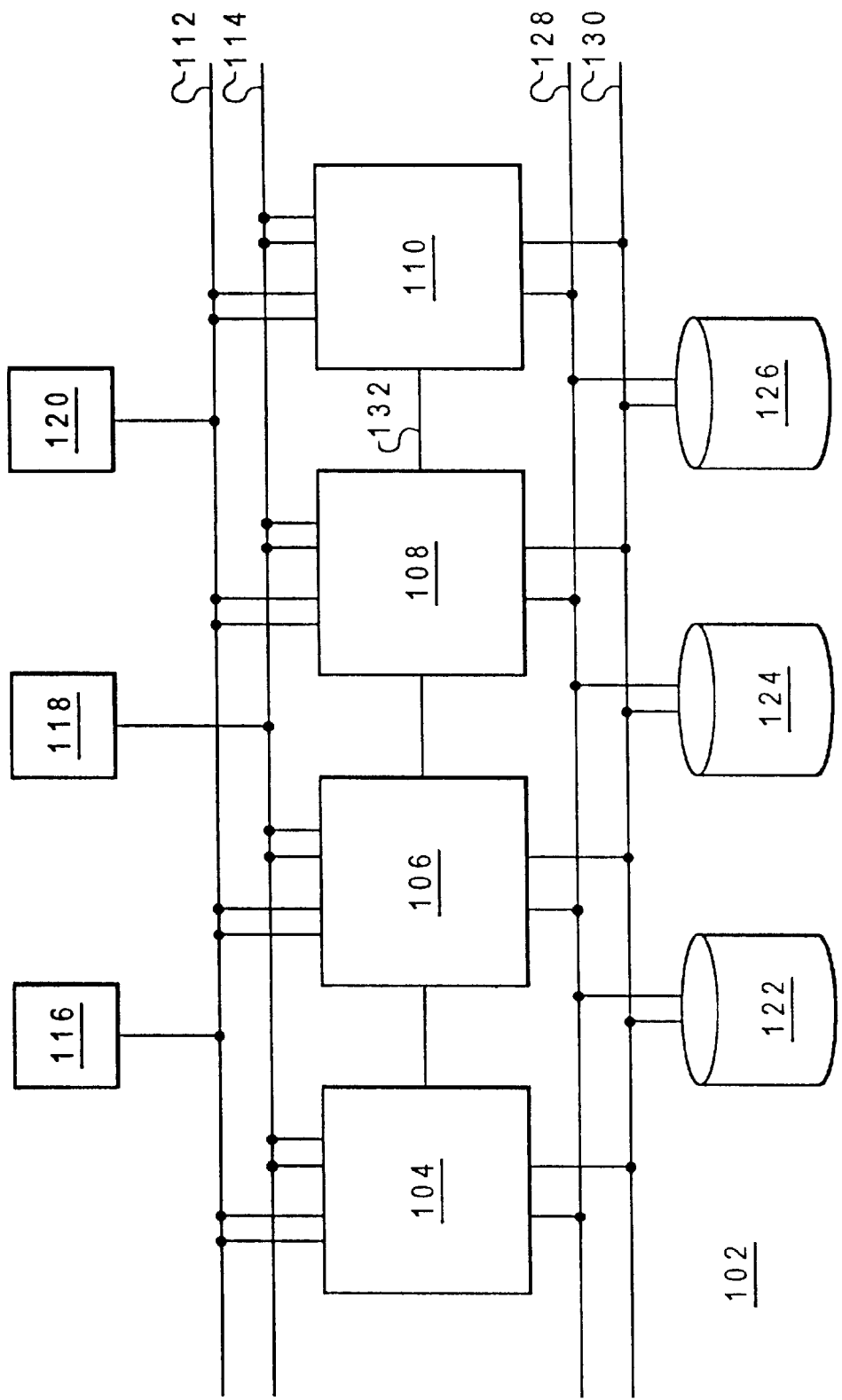
FIG. 1 depicts a diagram of a cluster multiprocessing system in which a preferred embodiment of the present invention may be implemented.

With reference now to the figures, and in particular with reference to FIG. 1, a diagram of a cluster multiprocessing system in which a preferred embodiment of the present invention may be implemented is depicted. System 102 includes a plurality of server nodes 104–110, each typically identified by a unique name. Each node 104–110 may be a symmetric multiprocessor (SMP) data processing system such as a RISC System/6000® system available from International Business Machines Corporation of Armonk, N.Y. or a data processing system functioning as a Windows NT™ server.

Each node 104–110 within system 102 includes an operating system, such as the Advanced Interactive Executive (AIX®) operating system available from International Business Machines Corporation of Armonk, N.Y. or the Windows NT™ operating system available from Microsoft Corporation of Redmond, Wash. Nodes 104–110 within system 102 also include high availability cluster software capable of running on top of or in conjunction with the operating system. This high availability cluster software includes the features described below.

Nodes 104–110 are connected to public local area networks 112–114, which may be an Ethernet, Token-Ring, fiber distributed data interface (FDDI), or other network. Public networks 112–114 provide clients 116–120 with access to servers 104–110. Clients 116–120 are data processing systems which may access, each running a "front end" or client application which queries server applications running on nodes 104–110.

Typically, each node 104–110 runs server or "back end" applications which access data on shared external disks 122–126 via disk buses 128–130. Nodes 104–110 may also be connected by an additional network 132 or networks. For example, a private network may provide point-to-point connection between nodes 104–110 within system 102, with no access provided to clients 116–120. The private network, if available, may be utilized for lock traffic, and may be an Ethernet, Token-Ring, FDDI, or serial optical channel connector (SOCC) network. A serial network may also provide point-to-point communication between nodes 104–110, used for control messages and heartbeat traffic in the event that an alternative subsystem fails.

As depicted in the exemplary embodiment, system 102 may include some level of redundancy to eliminate single points of failure. For example, each node 104–110 may be connected to each public network 112–114 by two network adapters (not shown): a service adapter providing the primary active connection between a node and network and a standby adapter which substitutes for the service adapter in the event that the service adapter fails. Thus, when a resource within system 102 becomes unavailable, alternative resources may be quickly substituted for the failed resource.

Those of ordinary skill in the art will appreciate that the hardware depicted in the exemplary embodiment of FIG. 1 may vary. For example, a system may include more or fewer nodes, additional clients, and/or other connections not shown. Additionally, the present invention may be implemented within any software which collects and processes events. Systems providing high availability are merely employed for the purposes of illustrating and explaining the invention.

Figure 2:
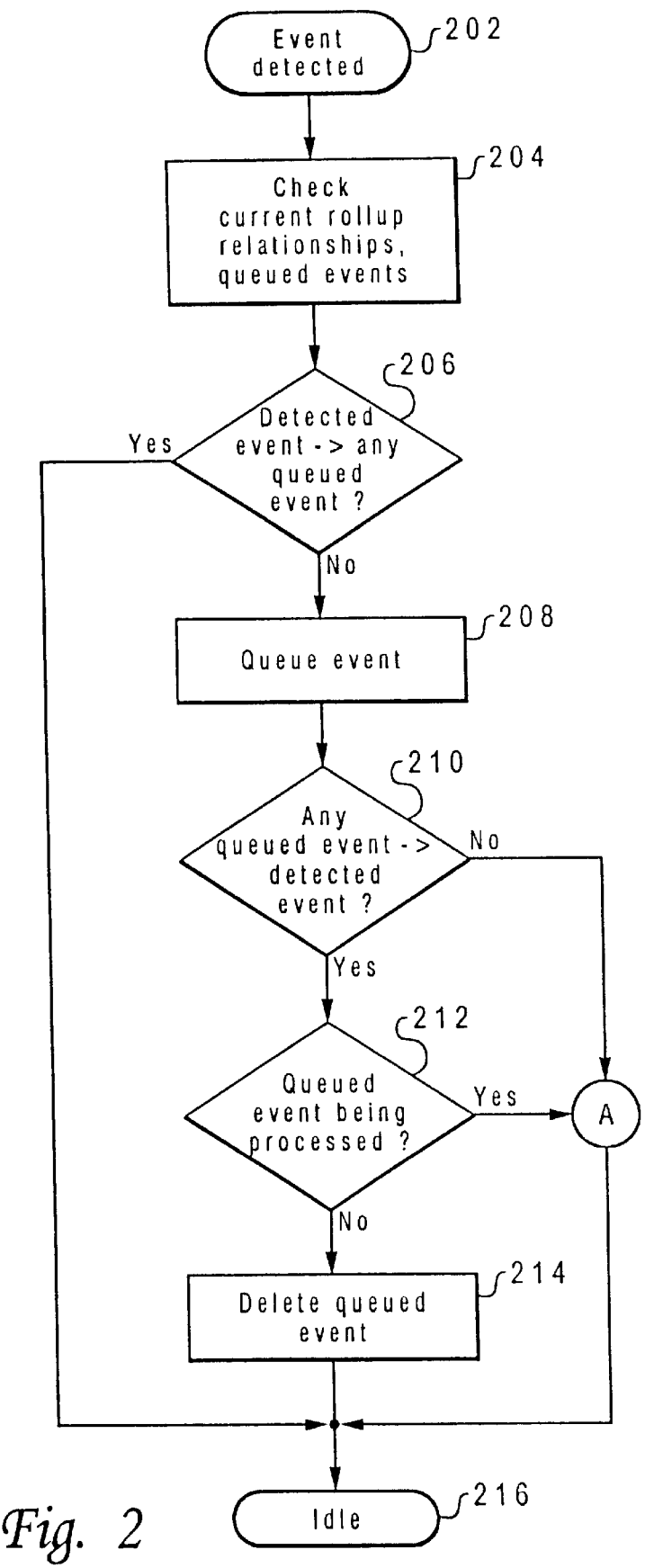
FIG. 2 is a high level flow chart for a process of handling an event queue in accordance with a preferred embodiment of the present invention.

Referring to FIG. 2, a high level flowchart for a process of handling an event queue in accordance with a preferred embodiment of the present invention is illustrated. The event queue in the exemplary embodiment is a replicated event queue maintained by a coordination component of the high availability cluster software. The coordination component is a distributed entity having a daemon running on each node within the cluster. The coordination component subscribes to other components of the high availability cluster software such as a component for handling node and adapter failures, a component for handling forced failovers by a system administrator, and/or a component for handling application server failures. The coordination component is notified by other components of events which have occurred through an API, collects the events, and determines which of the events should be enqueued for processing.

A wide variety of events may occur within a cluster multiprocessing system, most of which may be classified as a failure event, a recovery or reintegration event, or a dynamic reconfiguration event. Some specific examples of events which may occur include a node joining the cluster, a node leaving the cluster, a network failure, a network being connected to the cluster, replacement of a failed network adapter with a standby adapter, or a forced failure by a systems administrator.

When an event occurs, the event may be queued for processing. During event processing, a recovery program designated to handle the event is executed. The recovery program consists of distributed actions with intervening barriers between each action pair within the sequence of actions. The distributed actions are recovery statements which are executed in parallel on different nodes within the cluster. For example, when a network adapter fails and a standby adapter must be substituted, a recovery program statement swapping the standby adapter's network address with the failed service adapter's network address is executed. Optional barriers between statements allow the one statement to be completed on all nodes within the cluster before a subsequent statement is begun on any node within the cluster. For example, if an application server is to be changed to a different node, every node in the cluster must stop utilizing the application server on the current node before the application server is restarted on the new node.

The cluster management software in accordance with a preferred embodiment of the present invention permits users to define event rollup relationships. The event rollup relationships are defined utilizing the event names, such as "node_down" and "adapter_down", and are maintained in a list associated with the high availability software coordination component. For the purposes of generality, however, the notation "e1->e2" will be employed to indicate definition of an event rollup relationship where event e1 may be rolled up into event e2.

A user may wish to specify event rollup relationships for a variety of reasons. For example, where a network adapter failure is detected within a node having the highest priority for a given resource, and the node containing the network adapter has also failed, it may be desirable to simply recover from the failed node, which may obviate any need for switching to a standby adapter. Alternatively, if the standby adapter is located within the failed node, the user may not wish to attempt to restart an application using the standby adapter, which may be unreliable.

For highly available cluster systems, user defined event rollup relationships may be stored in the cluster configuration component. A user may specify a rollup relationship between any pair of events as part of the cluster configuration. The event rollup relationship definitions may take the form of:

adapter_down ->node_down or application_down ->adapter_down.

Events may be defined to roll up into events which are themselves rolled up into other events. For example, an "application_down" event may be rolled up into an "adapter_down" event, and the "adapter_down" event may itself be rolled up into a "node_down" event. The event rollup relationships defined may be dynamically changed at runtime without rebooting the cluster.

Turning to FIG. 2, the process for handing an event queue subject to customized event rollup relationships begins at step 202, which depicts detection of an event to be processed. The process then passes to step 204, which illustrates checking the current rollup relationships defined for the cluster and the cluster event queue. The process next passes to step 206, which depicts a determination of whether the detected event may be rolled up into at least one queued event. If so, the process simply passes to step 216, which illustrates the process becoming idle until a subsequent event is detected. No further action is required. The detected event need not be queued since it may be rolled up into an event already queued. Since transitive closure of event rollup relationships was determined at configuration and cycles were eliminated as described below, no determination of whether a queued event may be rolled up into the detected event should be necessary.

Referring again to step 206, if the detected event may not be rolled up into a queued event, the process proceeds instead to step 208, which depicts queuing the detected event. The process next passes to step 210, which illustrates a determination of whether any queued event may be rolled up into the detected event. Multiple queued events may be identified in which these queued events may be rolled up into the detected event. In such a circumstance, all such queued events which may be rolled up into the detected event are treated identically.

If at least one queued event may be rolled up into the detected event, the process proceeds to step 212, which depicts a determination of whether the queued event which may be rolled up into the detected event is being processed. If not, the process passes to step 214, which illustrates deleting the queued event which may be rolled up into the detected event from the queue.

If no queued event may be rolled up into the detected event, the process proceeds from step 210 to step 216, described above. Similarly, where a queued event which may be rolled up into the detected event is already being processed, the process proceeds from step 212 to step 216. Hybrid situations may occur where one queued event which may be rolled up into the detected event is being processed and must be left alone, while one or more other queued events which may be rolled up into the detected event are not yet being processed and may be deleted.

Figure 3:
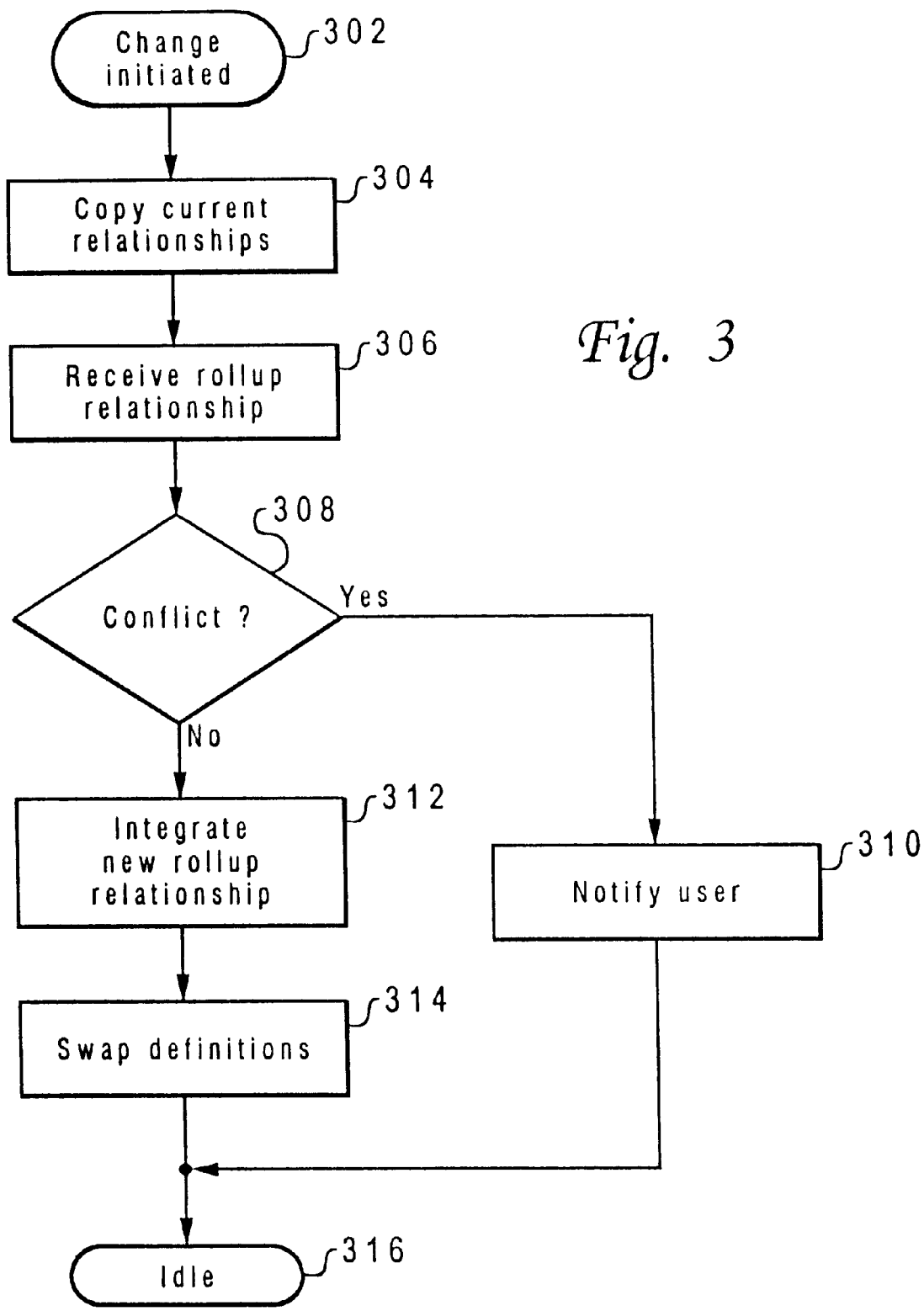
FIG. 3 depicts a high level flowchart for a process of dynamically changing user defined event rollup relationships in accordance with a preferred embodiment of the present invention.

With reference now to FIG. 3, a high level flowchart for a process of dynamically changing user defined event rollup relationships in accordance with a preferred embodiment of the present invention is depicted. The process relates to a user interface allowing deletion of existing rollup relationships and definition of new rollup relationships. The process begins at step 302, which depicts initiation of a change in the defined event rollup relationships. The process then passes to step 304, which illustrates copying the current event rollup relationships, allowing the current rollup definitions to be utilized while changes are made or attempted.

The process next passes to step 306, which depicts receiving a user-defined event rollup relationship. The process next passes to step 308, which illustrates a determination of whether the newly received event rollup relationship conflicts with existing event rollup relationships. Since any event may be defined as being rolled up into a number of other events, the conflict determination focuses on obtaining transitive closure to detect cycles. Transitive closure of rollup relationship definitions and detection of cycles are both meaningful for successfully maintaining a user-modifiable list of defined event rollup relationships. For example, if the rollup relationships e1->e2 and e2->e3 already exist, the rollup relationship e3->e1 cannot be permitted. The transitive closure algorithm and its use in the present invention is discussed in further detail below.

If a conflict exists, the process passes from step 308 to step 310, which depicts notifying the user that the newly-defined event rollup relationship cannot coexist with existing rollup relationships. The user must delete or otherwise modify existing rollup relationships in order to define the relationship for which a conflict was detected.

Referring again to step 308, if no conflict is detected, the process proceeds instead to step 312, which illustrates integrating the newly-defined event rollup relationship into the defined event rollup relationships. The process next passes to step 314, which depicts swapping the current event rollup relationships with the modified event rollup relationships, allowing the newly-defined relationship to be utilized. The process then passes to step 316, which illustrates the process becoming idle until another event rollup relationship definition is initiated by a user.

Figure 4:
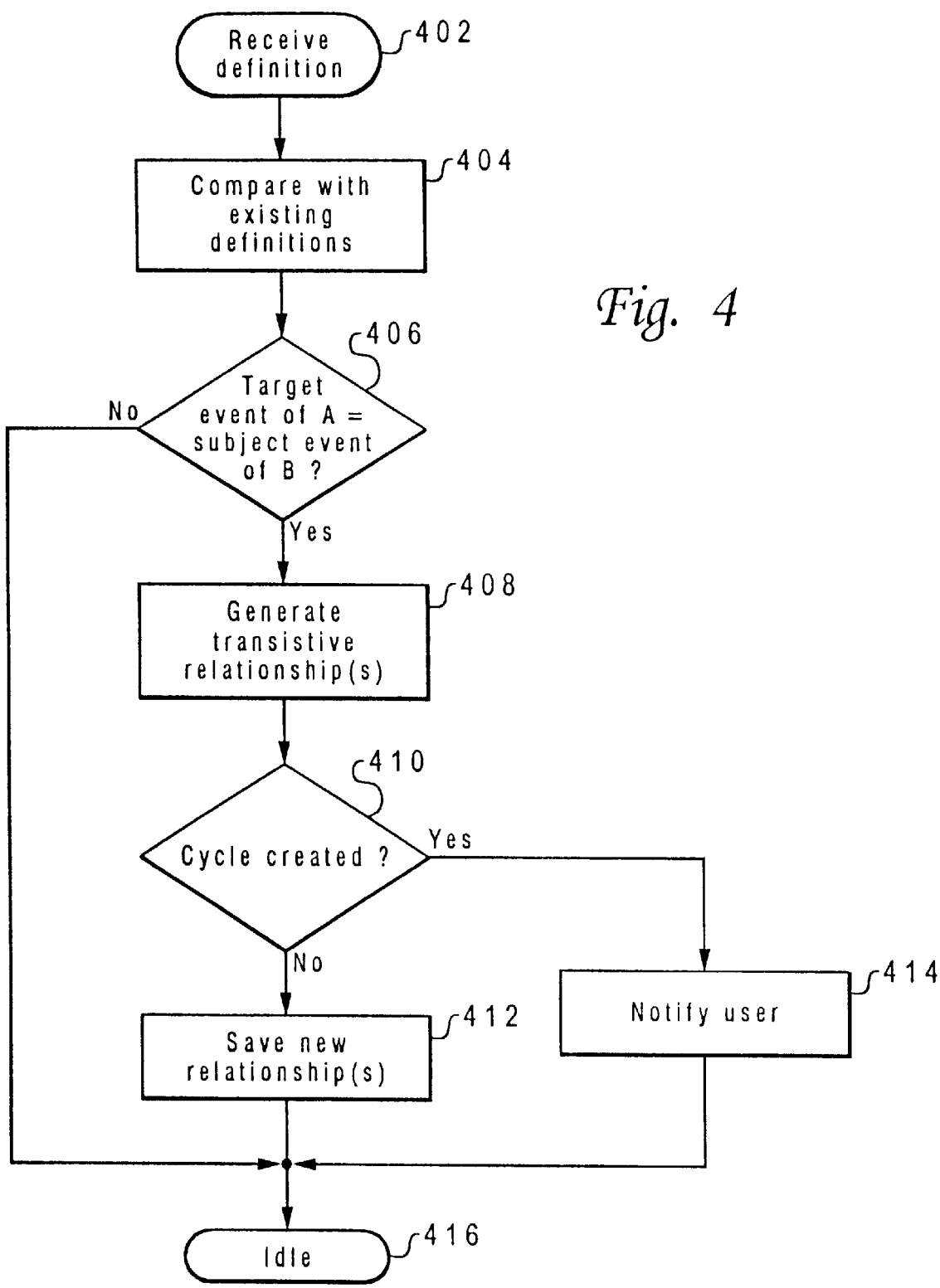
FIG. 4 is a high level flowchart for a process of resolving event rollup choices in accordance with a preferred embodiment of the present invention.

Referring to FIG. 4, a high level flowchart for a process of resolving event rollup choices in accordance with a preferred embodiment of the present invention is illustrated. The process depicted obtains transitive closure and detects cycles, and is similar to algorithms used for detecting deadlocks in distributed systems. The process begins at step 402, which depicts receiving an event rollup relationship definition. The rollup relationship definition may be characterized as including a subject event and a target event, where the notation e4->e5 indicates that subject event e4 may be rolled up into target event e5.

The process then passes to step 404, which illustrates comparing the received definition to existing rollup relationship definitions. The process next passes to step 406, which depicts a determination of whether the target event for one rollup relationship definition ("A") is also the subject of at least one other definition ("B"). The target event of the received definition is compared to the subject event of each existing definition. For example, if the definition e4->e5 were received, the existing rollup relationship definitions would be checked to determine if event e5 is the subject event of an existing definition. The target events of existing definitions are also compared to the subject event of the received definition. Thus, in the example described, existing definitions will be checked for event e4 as a target event.

If the received definition contains a target event which is also the subject of another existing definition, or contains a subject event which is the target of another definition, the process proceeds to step 408, which illustrates generating a transitive relationship definition. In the above example where the definition e4->e5 was received, if the existing definitions include the relationship definition e5->e6, the transitive definition e4 ->e6 would be generated. Similarly, if existing definitions include the relationship e6->e4, the transitive relationship definition e6->e5 would be generated. Multiple transitive relationship definitions may be generated, since both the target and subject events of a received definition may be part of existing definitions, and since either a target or subject event may form a part of multiple existing definitions. All possible transitive definitions created by the received definition are determined and added to the list of rollup relationship definitions.

The process then passes to step 410, which depicts a determination of whether a cycle is created by the received definition. For example, where the definitions e5->e6 and e6->e4 already exist, a received definition of e4->e5 would create a cyclical relationship definition. The generation of transitive relationships simplifies the detection of cycles since, once all possible transitive definitions have been determined, all definitions—existing, received, and transitive—may be compared to determine if two exist in which the target of one is the subject of the other and vice versa. Cycles can create runtime errors as a result of events being rolled up into themselves. For example, if a particular application server goes down, an "application_down" event may be enqueued. Before the "application_down" event is processed by all nodes in the cluster, however, the application server may be brought back up and go down again, resulting in a second "application_down" event. If the second "application_down" event is rolled up into the first, some nodes within the cluster may not properly recover.

If no cycles are created by the received definition, the process proceeds to step 412, which illustrates saving the received definition and all generated transitive definitions. If a cycle is created, the process proceeds instead to step 414, which illustrates notifying the user of the conflict and discarding the received and generated transitive definitions. From either step 412 or 414, or from step 406 if the received definition has no transitive relationship to existing definitions, the process passes to step 416, which illustrates the process becoming idle until another event rollup relationship definition is received.

The present invention supports rollup among an arbitrary number of events within a cluster. User specified event rollup information, which may be dynamically changed, is utilized, permitting customization of event rollup relationships. Transitive closure of event rollup information is automatically generated whenever an event rollup relationship is specified or changed, allowing cycles to be detected at configuration time and avoiding runtime errors.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of rolling-up events within an event queue, comprising:

maintaining a modifiable list of defined rollup relationships;

comparing a detected event and at least one queued event to at least one defined rollup relationship; and responsive to determining that said detected event and said at least one queued event match said at least one defined rollup relationship, handling said detected event and said at least one queued event according to said at least one defined rollup relationship.

2. The method of claim 1, wherein the step of handling said detected event and said at least one queued event according to said at least one defined rollup relationship further comprises:

failing to enqueue said detected event.

3. The method of claim 1, wherein the step of handling said detected event and said at least one queued event according to said at least one defined rollup relationship further comprises:

deleting said at least one queued event.

4. The method of claim 1, wherein said at least one queued event comprises a plurality of queued events, the method further comprising:

comparing said detected event and each queued event within said plurality of queued events to said at least one defined rollup relationship; and responsive to determining that said detected event and a specific queued event within said plurality of queued events matches said at least one defined rollup relationship, handling said detected event and said specific queued event according to said at least one defined rollup relationship.

5. The method of claim 1, wherein said defined rollup relationship comprises a plurality of defined rollup relationships, the method further comprising:

comparing said detected event and said at least one queued event to each defined rollup relationship within said plurality of defined rollup relationships; and responsive to determining that said detected event and said at least one queued event matches a specific defined rollup relationship within said plurality of defined rollup relationships, handling said detected event and said at least one queued event according to said specific defined rollup relationship.

6. An apparatus for rolling-up events within an event queue, comprising:

memory means for maintaining a modifiable list of defined rollup relationships;

comparison means for comparing a detected event and at least one queued event to at least one defined rollup relationship; and event handling means, responsive to determining that said detected event and said at least one queued event match said at least one defined rollup relationship, for handling said detected event and said at least one queued event according to said at least one defined rollup relationship.

7. The apparatus of claim 6, wherein said event handling means further comprises:

means for failing to enqueue said detected event.

8. The apparatus of claim 6, wherein said event handling means further comprises:

means for deleting said at least one queued event.

9. The apparatus of claim 6, wherein said at least one queued event comprises a plurality of queued events, the apparatus further comprising:

comparison means for comparing said detected event and each queued event within said plurality of queued events to said at least one defined rollup relationship; and event handling means, responsive to determining that said detected event and a specific queued event within said plurality of queued events matches said at least one defined rollup relationship, for handling said detected event and said specific queued event according to said at least one defined rollup relationship.

10. The apparatus of claim 6, wherein said defined rollup relationship comprises a plurality of defined rollup relationships, the apparatus further comprising:

comparison means for comparing said detected event and said at least one queued event to each defined rollup relationship within said plurality of defined rollup relationships; and event handling means, responsive to determining that said detected event and said at least one queued event matches a specific defined rollup relationship within said plurality of defined rollup relationships, for handling said detected event and said at least one queued event according to said specific defined rollup relationship.

11. A method of generating transitive event rollup relationships, comprising:

receiving an event rollup relationship definition;

comparing a target event of said received definition to a subject event of at least one stored event rollup relationship definition; and responsive to determining that said target event matches said subject event, generating a transitive event rollup relationship definition having a subject event coinciding with a subject event for said received definition and a target event coinciding with a target event of said at least one stored definition.

12. The method of claim 11, further comprising:

storing said received definition and said generated transitive definition.

13. The method of claim 11, wherein said at least one stored definition further comprises a plurality of stored event rollup relationship definitions each having an associated subject event, the method further comprising:

comparing said target event to a subject event for each stored definition in said plurality of stored definitions; and responsive to determining that said target event matches said a subject event for a specific stored definition within said plurality of stored definitions, generating a transitive event rollup relationship definition having a subject event coinciding with a subject event for said received definition and a target event coinciding with a target event of said specific stored definition.

14. The method of claim 11, further comprising:

comparing a subject event of said received definition to a target event of said at least one stored definition; and responsive to determining that said subject event of said received definition matches said target event of said at least one stored definition, generating a transitive event rollup relationship definition having a target event coinciding with a target event for said received definition and a subject event coinciding with a subject event of said at least one stored definition.

15. The method of claim 11, further comprising:

creating a copy of said at least one stored definition;

checking said received definition, said at least one stored definition, and said generated transitive definition for a cycle;

responsive to not detecting a cycle for said received definition, said at least one stored definition, and said generated transitive definition, adding said received definition, said at least one stored definition, and said generated transitive definition to said copy; and exchanging said copy and said at least one stored definition.

16. The method of claim 15, wherein the step of checking said received definition, said at least one stored definition, and said generated transitive definition for a cycle further comprises:

comparing said target event of said received definition to said subject event of said at least one stored definition;

comparing a subject event of said received definition to a target event of said at least one stored definition; and responsive to determining that said target event of said received definition matches said subject event of said at least one stored definition and that said subject event of said received definition matches said target event of said at least one stored definition, indicating that a cycle has been detected.

17. A computer program product for use with a data processing system, comprising:

a computer usable medium;

first instructions on said computer usable medium for maintaining a modifiable list of defined rollup relationships;

second instructions on said computer usable medium for comparing a detected event and at least one queued event to at least one defined rollup relationship; and third instructions on said computer usable medium, responsive to determining that said detected event and said at least one queued event match said at least one defined rollup relationship, for handling said detected event and said at least one queued event according to said at least one defined rollup relationship.

18. A computer program product for use with a data processing system, comprising:

a computer usable medium;

first instructions on said computer usable medium for receiving an event rollup relationship definition;

second instructions on said computer usable medium for comparing a target event of said received definition to a subject event of at least one stored event rollup relationship definition; and third instructions on said computer usable medium, responsive to determining that said target event matches said subject event, for generating a transitive event rollup relationship definition having a subject event coinciding with a subject event for said received definition and a target event coinciding with a target event of said at least one stored definition.

19. The computer program product of claim 18, further comprising:

fourth instructions on said computer usable medium for storing said received definition and said generated transitive definition.

20. The computer program product of claim 19, further comprising:

fifth instructions on said computer usable medium for comparing said target event to a subject event for each stored definition in a plurality of stored definitions; and sixth instructions on said computer usable medium, responsive to determining that said target event matches said a subject event for a specific stored definition within said plurality of stored definitions, for generating a transitive event rollup relationship definition having a subject event coinciding with a subject event for said received definition and a target event coinciding with a target event of said specific stored definition.

21. A cluster multiprocessing system, comprising:

a plurality of nodes connected by at least one network, each node within said plurality of nodes including a memory containing at least one user defined event rollup relationship definition; and cluster multiprocessing system software executing on each node, said software:

comparing a detected event and at least one queued event to at least one user defined rollup relationship; and responsive to determining that said detected event and said at least one queued event match said at least one rollup relationship, handling said detected event and said at least one queued event according to said at least one user defined rollup relationship.

22. The cluster multiprocessing system of claim 21, further comprising:

a user interface accessing at least one node within said plurality of nodes, the user interface receiving a user-defined event rollup relationship definition.

23. The cluster multiprocessing system of claim 21, said cluster multiprocessing software:

comparing a target event of a received user-defined definition to a subject event of said at least one stored event rollup relationship definition; and responsive to determining that said target event matches said subject event, generating a transitive event rollup relationship definition having a subject event coinciding with a subject event for said received user-defined definition and a target event coinciding with a target event of said at least one stored definition.

\* \* \* \* \*